United States Patent [19]

Nozaki et al.

[11] Patent Number: 5,711,907
[45] Date of Patent: Jan. 27, 1998

[54] METHOD FOR PRODUCING A WEATHER STRIP FOR A MOTOR VEHICLE

[75] Inventors: Masahiro Nozaki, Tsushima; Tatsuhiko Nagata, Kounan, both of Japan

[73] Assignee: Toyoda Gosei Co., Ltd., Aichi, Japan

[21] Appl. No.: 602,446

[22] Filed: Feb. 16, 1996

[30] Foreign Application Priority Data

Feb. 22, 1995 [JP] Japan ................ 7-58099

[51] Int. Cl.$^6$ ............ B29C 33/46; B29C 45/43; B28B 21/52
[52] U.S. Cl. ............ 264/138; 264/139; 264/148; 264/150; 264/516; 264/250; 264/259; 264/334; 264/335
[58] Field of Search ............ 264/138, 139, 264/150, 154, 516, 564, 250, 334, 335, 259, 148

[56] References Cited

U.S. PATENT DOCUMENTS

| | | | |
|---|---|---|---|
| 4,620,959 | 11/1986 | Goto et al. | 264/335 |
| 4,719,067 | 1/1988 | Thiel | 264/139 |
| 4,861,530 | 8/1989 | Zaccaria | 264/149 |
| 4,986,947 | 1/1991 | Shigeki et al. | 264/250 |
| 5,395,579 | 3/1995 | Fujihara et al. | 264/250 |
| 5,494,630 | 2/1996 | Erybar et al. | 264/138 |

FOREIGN PATENT DOCUMENTS

| | | | |
|---|---|---|---|
| 0022735 | 2/1984 | Japan | 264/138 |
| 0067035 | 4/1984 | Japan | 264/138 |
| 2297569 | 12/1987 | Japan | 264/138 |
| 3290714 | 11/1988 | Japan | 264/138 |

*Primary Examiner*—Jan H. Silbaugh
*Assistant Examiner*—Robin S. Gray
*Attorney, Agent, or Firm*—Cushman Darby & Cushman, IP Group of Pillsbury Madison & Sutro LLP

[57] ABSTRACT

A method for producing a weather strip having a molded end portion joined to an end of an extruded weather strip having a base portion and a tubular seal portion. The method includes the steps of cutting-off a portion of the tubular seal portion from the end of the extruded weather strip with the base portion thereof remaining uncut, placing the uncut base portion of the end of the extruded weather strip in a cavity of a mold, placing a core along the uncut base portion, injecting a molding material into the cavity to mold a tubular part having a configuration conforming to the cut off tubular seal portion integrally with a fin-like end part extending from the tubular part, opening the mold, and removing the core from the tubular part along a reverse face of the fin-like end part.

4 Claims, 3 Drawing Sheets

METHOD FOR PRODUCING A WEATHER STRIP FOR A MOTOR VEHICLE

The priority application, Japanese Patent Application No. Hei 7-58099, filed in Japan on Feb. 22, 1995, is hereby incorporated by reference into the present specification.

BACKGROUND OF THE INVENTION

1. Field of the Invention

The present invention relates to weather strips for motor vehicles, and, more particularly, to a method for producing weather strips having molded end portions joined to ends of extruded strip portions.

2. Description of Related Art

As shown in FIG. 1, a weather strip W is attached to a body panel around door openings of a motor vehicle to seal around door window panes 10 of closed doors. The weather strip W generally includes a tubular seal portion to be pushed by peripheral edges of the door window panes 10 and a base portion to be fitted in a retainer secured to the body panel around the door openings.

To attach the weather strips W to the body panel of a motor vehicle, molded end portions are joined to ends of the weather strip W, which are denoted by reference characters A, B and C in FIG. 1. FIG. 2(A) illustrates a molded end portion of one example of a conventional weather strip, which is seen from a reverse side thereof. As shown, a tubular part 18 and a fin-like end part 20 which extends from the tubular part 18 are molded integrally with an end of an extruded weather strip 16 including a base portion 12 and a tubular seal portion 14, thus providing a weather strip W1.

The tubular part 18 and the fin-like end part 20 are generally formed by placing the end of the extruded weather strip 16 in a cavity of a mold, and injecting a molding material into the cavity. During this molding step, the tubular part 18, integral with the fin-like end part 20, is joined to the extruded weather strip 16.

The tubular part 18 is molded with a core inserted into the cavity. To remove this core after molding, a core-removing opening 22 is formed in a bottom wall of the molded tubular part 18, as shown in FIGS. 2(A) and 2(B) (See Japanese Utility Model application laid-open No. Hei 3-43050).

This core-removing opening 22, however, reduces the attaching stability of the molded end portion to the retainer. Furthermore, water or the like may intrude into the resultant weather strip through this core-removing opening 22. To overcome these problems, the core-removing opening 22 has been closed with a bonding agent or the like. Around this core-removing opening 22, flash is inevitably formed during molding due to the intrusion of the molding material between the core and opposed mold members or walls around the core-removing opening. This flash must be removed before closing the core-removing opening 22, but, this operation is extremely troublesome.

SUMMARY OF THE INVENTION

Accordingly, it is an object of the present invention to provide a method for producing a weather strip, by which an end portion can be molded onto an end of an extruded strip portion without forming a core-removing opening.

The weather strip of the present invention is formed by the following method. An extruded weather strip including a base portion and a tubular seal portion is prepared, and only a portion of the tubular seal portion is cut-off to a predetermined length at an end of the prepared extruded weather strip.

Then, the uncut base portion of the end of the extruded weather strip is placed in a cavity of a mold, and a core is placed along the uncut base portion.

Next, a molding material is injected into the cavity to form around the core, a tubular part having a configuration conforming to the cut-off tubular seal portion integrally with a fin-like end part which extends from the tubular part.

After molding, the mold is opened and the core is removed along a reverse face of the fin-like end part.

The reverse face of the fin-like end part is provided with a depression having a width greater than the diameter of the core, which interconnects with an end opening of the molded tubular part. This depression enables the core to be smoothly drawn from the molded tubular part along the reverse face of the fin-like end part.

By composing the base portion of the extruded weather strip of solid rubber, the surface slidability thereof can be made better than that of sponge rubber to facilitate the removal of the core from the molded end portion.

DETAILED DESCRIPTION OF THE PRESENTLY PREFERRED EXEMPLARY EMBODIMENTS

The present invention will be explained based on an embodiment wherein a weather strip, adapted to be attached along a side of a roof around door openings of a motor vehicle, is produced.

Figure 1:
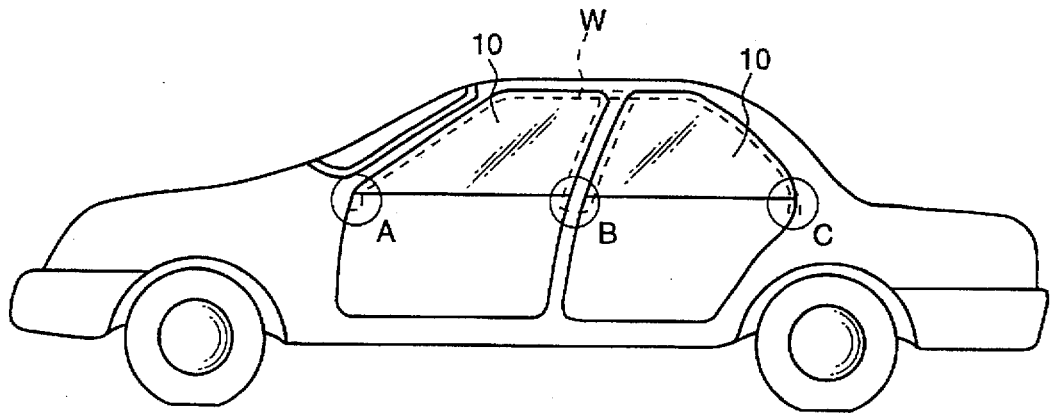
FIG. 1 is a side elevational view of a motor vehicle to which the present invention is applied.
Figure 2A:
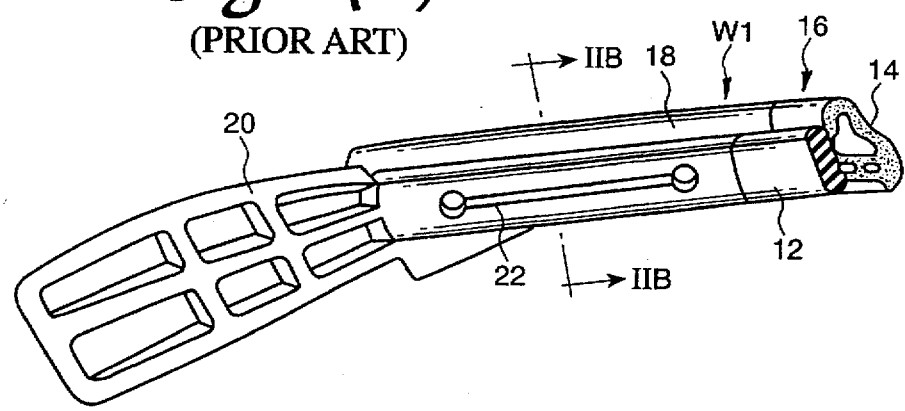
FIG. 2(A) is a perspective view of a molded end portion of a conventional weather strip.
Figure 2B:
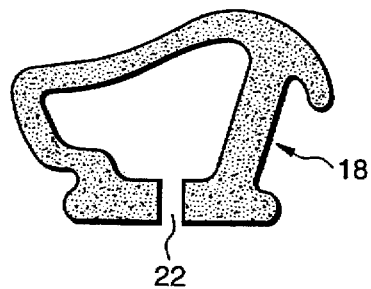
FIG. 2(B) is a cross-sectional view taken along the line IIB—IIB of FIG. 2(A)
Figure 3A:
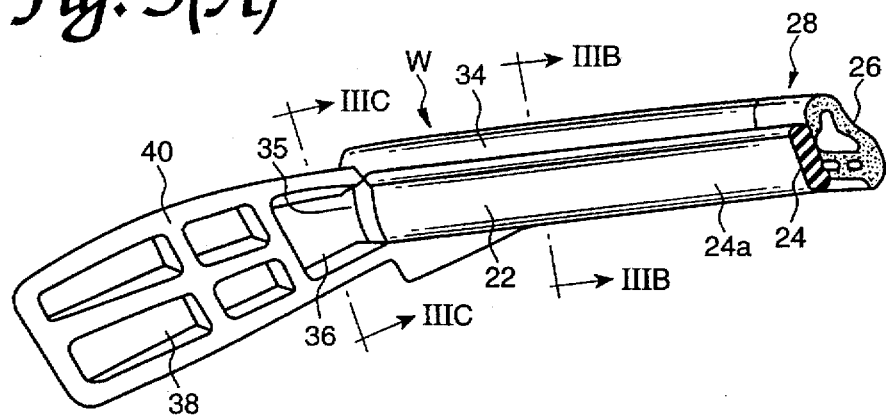
FIG. 3(A) is a perspective view of a molded end portion formed onto an end of an extruded weather strip by a method in accordance with the present invention.
Figure 3B:
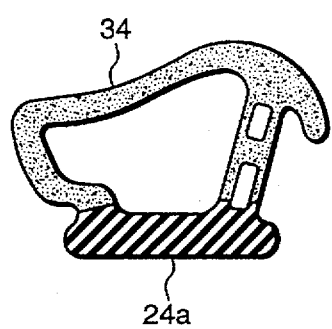
FIG. 3(B) is a cross-sectional view taken along the line IIIB—IIIB of FIG. 3(A)
Figure 3C:
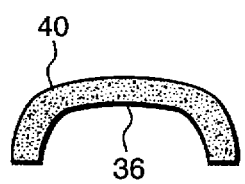
FIG. 3(C) is a cross-sectional view taken along the line IIIC—IIIC of FIG. 3(A)

FIGS. 3(A) to 3(C) show an end portion of a weather strip W produced by the method in accordance with the present invention.

Figure 3D:
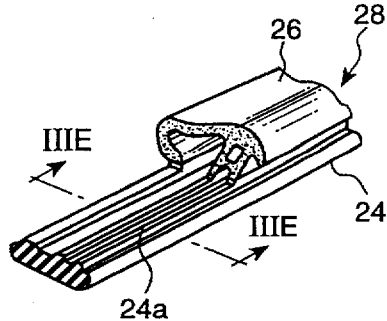
FIG. 3(D) is a perspective view of the end of the extruded weather strip from which the tubular seal portion is cut-off.

To produce the weather strip W, an extruded weather strip 28 including a base portion 24 composed of solid rubber and a tubular seal portion 26 composed of sponge rubber is prepared, and, as shown in FIG. 3(D), only a portion of the tubular seal portion 26 is cut-off at a predetermined length at the end of the prepared extruded weather strip 28 with the base portion 24a thereof remaining uncut.

Figure 3E:
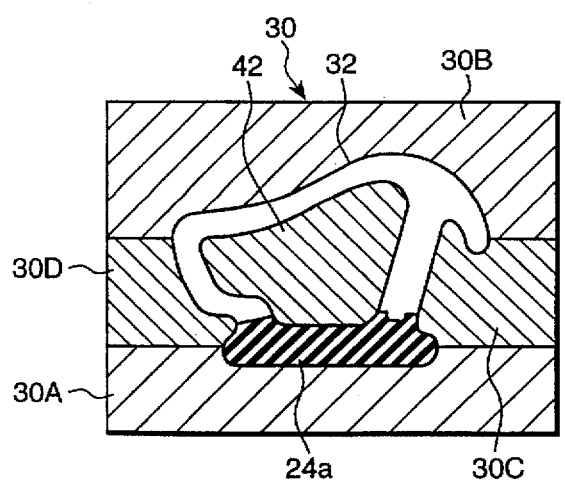
FIG. 3(E) is a cross-sectional view of the end of the extruded weather strip, taken along the line IIIE—IIIE of FIG. 3(D), which is placed in a mold.

Next, as shown in FIG. 3(E), the uncut base portion 24a of the end of the extruded weather strip 28 is placed in a cavity 32 of a mold 30. The mold 30 is composed of a lower mold member 30A, upper mold member 30B, intermediate mold members 30C and 30D which define the cavity 32. The cavity 32 defines a molding chamber for molding a tubular part 34 (FIG. 3(A)), which has a cross-section identical to that of the tubular seal portion 26 of the extruded weather strip 28, and a second molding chamber (not shown) for molding a fin-like end part 40 (FIG. 3(A)). As shown in FIGS. 3(A) and 3(C), the second molding chamber has a configuration capable of forming in a reverse face of the fin-like part 40, a depression 36 having great width, which interconnects with an end opening 35 of the tubular part 34, and a plurality of small depressions 38 separated from each other.

Then, a core 42 is placed along the uncut base portion 24a within the cavity, and a molding material is injected into the cavity 32. Thus, as shown in FIGS. 3(A), 3(B) and 3(C), the tubular part 34 having a cross-section identical to that of the tubular seal portion 26 of the extruded weather strip 28, and the fin-like end part 40 which extends continuously from the tubular part 34 are formed integrally with the end of the extruded weather strip 28.

After the molding operation, the mold is opened and the molded end portion is removed from the mold. Next, the core 42, disposed within the molded tubular part 34, is removed through the end opening 35 by drawing the core 42 along the depression 36 formed in the reverse face of the molded end part 40, and pulling it obliquely downwards.

The uncut base portion 24a is composed of an extruded body of solid rubber so that the surface slidability thereof is good so as to facilitate the removal of the core 42. By forcibly injecting air between the core 42 and the surrounding molded tubular part 34, the molded tubular part 34 is expanded to facilitate the removal of the core 42 further.

In the above embodiment, a molded end portion is formed onto an end of an extruded weather strip having a tubular configuration. The present invention is also applicable to other weather strips with different configurations.

Figure 4:
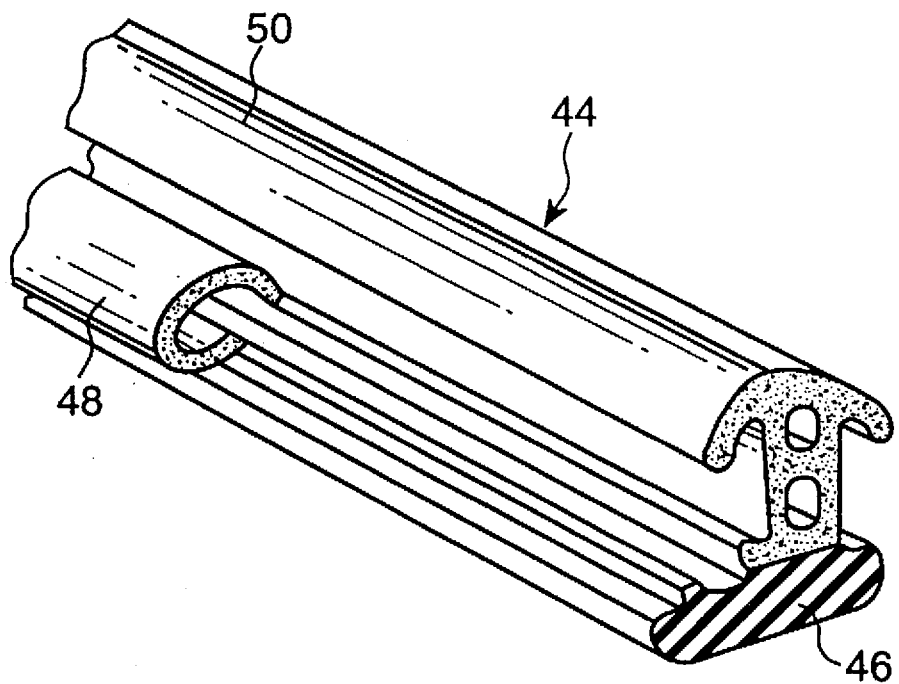
FIG. 4 is a perspective view of an end of another extruded weather strip from which a tubular seal portion is cut-off.

As shown in FIG. 4, an extruded weather strip 44 includes a base portion 46, a tubular seal portion 48 and a lip-like seal portion 50. Only a portion of the tubular seal portion 48 is cut-off from an end of the extruded weather strip 44. The formation of a molded end portion and removal of a core are respectively performed similarly to that of the preceding embodiment.

With the present invention, an end portion can be integrally molded onto an end of a weather strip having a tubular seal portion without removing a core through a core-removing opening therein. The weather strip obtained by the method of the present invention exhibits good attaching stability when attached to a retainer, because the resultant weather strip has no core-removing opening. In addition, there is no need for the closing operation of the core-removing opening, which eliminates the operations of removing flashes and closing the core-removing opening, which reduces production steps and thus production costs.

While the invention has been described in connection with what are considered presently to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for producing a weather strip having a molded end portion which is joined to an end of an extruded weather strip having a base portion and a tubular seal portion, the method including:

cutting-off a portion of the tubular seal portion from an end of said extruded weather strip to form a cut-off portion, the base portion thereof remaining uncut defining an uncut base portion and a remaining tubular seal portion;

placing said uncut base portion of the end of the extruded weather strip in a cavity of a mold, and placing a core along said uncut base portion within the cavity;

injecting a molding material into the cavity to mold a tubular part around the core integrally with an outwardly extending end part which extends longitudinally from an end of the tubular part, the tubular part having a configuration conforming to the cut-off portion of the tubular seal portion and being joined to said uncut base portion and having an opening at said end of said tubular part adjacent said outwardly extending end part; and opening the mold and removing the core from the tubular part through said opening and along a face of said outwardly extending end part.

2. The method according to claim 1, wherein in the injecting step, said outwardly extending end part is molded so that said face of said outwardly extending end part has a depression formed therein having a width greater than a diameter of the core, the depression interconnecting with said opening of said tubular part, and wherein said removing step further includes removing said core through said opening of said tubular part and along said depression.

3. The method according to claim 1, wherein said uncut base portion of the extruded weather strip is composed of solid rubber, and the tubular seal portion of the extruded weather strip, the tubular part, and said outwardly extending end part are composed of sponge rubber, said uncut base portion permitting the core to slide easily along a surface thereof during the step of removing the core from said tubular part.

4. The method according to claim 2, further including injecting air between the core and the tubular part to expand the tubular part to facilitate said removal of the core.

* * * * *